United States Patent
Sakata

(10) Patent No.: US 10,315,519 B2
(45) Date of Patent: Jun. 11, 2019

(54) COOLING SYSTEM FOR AN ELECTRIC DEVICE

(75) Inventor: Kazuki Sakata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1079 days.

(21) Appl. No.: 13/083,288

(22) Filed: Apr. 8, 2011

(65) Prior Publication Data
US 2012/0102995 A1  May 3, 2012

(30) Foreign Application Priority Data

Oct. 28, 2010 (JP) ................. 2010-242088

(51) Int. Cl.
*B60L 3/00* (2019.01)
*B60L 1/00* (2006.01)
*B60L 11/18* (2006.01)

(52) U.S. Cl.
CPC ............ *B60L 3/0061* (2013.01); *B60L 1/003* (2013.01); *B60L 3/003* (2013.01);
(Continued)

(58) Field of Classification Search
CPC ........................ Y02T 10/7216; F01P 2050/24; B60L 3/0061; B60L 3/0046; B60L 3/003; B60L 11/187; B60L 11/1874; B60L 11/1875
(Continued)

(56) References Cited

U.S. PATENT DOCUMENTS 5,678,760 A * 10/1997 Muso .................... B60K 11/02
                                                    165/41
5,752,655 A *  5/1998 Kodama ................ B60H 1/032
                                                    237/12.3 B
(Continued)

FOREIGN PATENT DOCUMENTS

DE    43 33 613 A1      4/1994
DE    19542125 A1 *    5/1996    ......... B60H 1/00278
(Continued)

OTHER PUBLICATIONS

Japanese Office Action dated Jul. 24, 2012 issued in Japanese Patent Application No. 2010242088.
(Continued)

*Primary Examiner* — Frantz F Jules
*Assistant Examiner* — Steve S Tanenbaum
(74) *Attorney, Agent, or Firm* — Sughrue Mion, PLLC

(57) ABSTRACT

The cooling system includes a heat exchanger, the circulating pump, a first refrigerant channel in which an electric device and the circulating pump are provided, a second refrigerant channel connected to the first refrigerant channel so as to form a circulation channel of the refrigerant, in which the heat exchanger is provided, a bypass channel connected to the first refrigerant channel in parallel to the second refrigerant channel, in which a charger is provided, and a valve provided at a position where the first refrigerant channel and the bypass channel are connected to each other, for forming a circulation channel of the refrigerant, the circulation channel including the first refrigerant channel and the second refrigerant channel, to restrict a flow of the refrigerant through the bypass channel when the electric device is in operation.

7 Claims, 9 Drawing Sheets

(52) U.S. Cl.
CPC ....... *B60L 11/1874* (2013.01); *B60L 2240/36* (2013.01); *B60L 2240/425* (2013.01); *B60L 2240/525* (2013.01); *B60L 2240/545* (2013.01); *Y02T 10/642* (2013.01); *Y02T 10/705* (2013.01); *Y02T 10/7005* (2013.01)

(58) Field of Classification Search
USPC .................................................. 62/243, 133
See application file for complete search history.

(56) References Cited

U.S. PATENT DOCUMENTS

| | | | | |
|---|---|---|---|---|
| 5,834,132 | A * | 11/1998 | Hasegawa | B60H 1/00278 429/62 |
| 6,188,574 | B1 * | 2/2001 | Anazawa | B60K 1/04 180/68.5 |
| 6,213,233 | B1 * | 4/2001 | Sonntag | B60H 1/004 123/142.5 R |
| 6,607,142 | B1 * | 8/2003 | Boggs | B60K 6/22 180/65.1 |
| 7,284,594 | B2 * | 10/2007 | Sanada | F28F 9/002 165/132 |
| 7,681,676 | B2 * | 3/2010 | Kydd | B60K 6/48 180/65.21 |
| 8,919,471 | B2 * | 12/2014 | Oberti | B60K 1/00 180/68.4 |
| 9,707,823 | B2 * | 7/2017 | Feuerecker | B60H 1/00921 |
| 2001/0040061 | A1 | 11/2001 | Matuda | B60H 1/00278 180/68.2 |
| 2003/0127528 | A1 * | 7/2003 | Sabhapathy | B60H 1/04 237/12.3 B |
| 2004/0069546 | A1 * | 4/2004 | Lou | B60K 6/22 180/65.21 |
| 2005/0061497 | A1 * | 3/2005 | Amaral | B60H 1/00278 165/202 |
| 2005/0133215 | A1 * | 6/2005 | Ziehr | B60H 1/00392 165/202 |
| 2005/0274814 | A1 * | 12/2005 | Schwartz | B60H 1/00392 237/28 |
| 2006/0196634 | A1 * | 9/2006 | Sato et al. | 165/41 |
| 2007/0298296 | A1 * | 12/2007 | Greifenstein | H01M 8/04029 62/236 |
| 2010/0050676 | A1 * | 3/2010 | Takamatsu | B60K 11/02 62/259.2 |
| 2010/0127669 | A1 * | 5/2010 | Iida | B60L 11/1861 320/162 |
| 2011/0106358 | A1 * | 5/2011 | Sawada | B60K 11/02 701/22 |
| 2011/0132030 | A1 * | 6/2011 | Kim | B60H 1/00885 62/507 |
| 2012/0132394 | A1 * | 5/2012 | Oberti | B60K 1/00 165/51 |
| 2012/0174602 | A1 * | 7/2012 | Olivier | B60H 1/004 62/79 |
| 2012/0222438 | A1 * | 9/2012 | Osaka | B60H 1/00271 62/126 |
| 2012/0225341 | A1 * | 9/2012 | Major | B60H 1/00278 429/120 |
| 2014/0038009 | A1 * | 2/2014 | Okawa | H01M 10/486 429/62 |

FOREIGN PATENT DOCUMENTS

| | | | |
|---|---|---|---|
| DE | 10 2004 035 879 A1 | 2/2006 | |
| JP | 04-275492 | * 10/1992 | |
| JP | 04-275492 A | 10/1992 | |
| JP | 2002-205532 A | 7/2002 | |
| JP | 2006-219083 A | 8/2006 | |
| JP | 2008-120244 A | 5/2008 | |
| WO | WO 2010116104 A1 * | 10/2010 | ............... B60K 1/00 |

OTHER PUBLICATIONS

Communication dated Apr. 15, 2016 from German Patent Office in counterpart Application No. 10 2011 101 003.7.

* cited by examiner

COOLING SYSTEM FOR AN ELECTRIC DEVICE

BACKGROUND OF THE INVENTION

1. Field of the Invention

The present invention relates to a cooling system for cooling an electric device to be driven by electric power from a battery.

2. Description of the Related Art

FIG. 8 is a configuration diagram illustrating a conventional cooling system for an electric vehicle. In FIG. 8, the conventional cooling system includes a radiator (heat exchanger) 101, a circulating pump 102, a first cooling fluid channel 103A, a second cooling fluid channel 103B, a bypass channel 104, and a valve 105.

The radiator 101 is provided in the second cooling fluid channel 103B. The radiator 101 dissipates heat of a cooling fluid to outside to cool the cooling fluid. The circulating pump 102 is provided in the first cooling fluid channel 103A. The circulating pump 102 applies a pressure for causing the cooling fluid to flow, to the cooling fluid.

The first cooling fluid channel 103A and the second cooling fluid channel 103B are connected to each other to form a circulation channel of the cooling fluid through the radiator 101 and the circulating pump 102. The bypass channel 104 is connected to the first cooling fluid channel 103A in parallel to the second cooling fluid channel 103B so as to bypass the radiator 101.

The valve 105 is provided at a position where the first cooling fluid channel 103A and the bypass channel 104 are connected to each other. The valve 105 switches a direction of the flow of the cooling fluid, which is discharged from the circulating pump 102 to pass through the first cooling fluid channel 103A, between a direction to the radiator 101 and a direction to the bypass channel 104. The switching operation of the valve 105 is controlled by a system control section 150.

A charger 106, an inverter 107, and a motor (electric device) 108 for vehicle running are provided in the first cooling fluid channel 103A. The charger 106 converts AC power received from outside into DC power and charges a battery (not shown) with the DC power. The inverter 107 converts the DC power received from the battery into AC power and supplies the AC power to the motor 108.

The system control section 150 controls the switching operation of the valve 105 according to a temperature of the cooling fluid to switch the direction of the flow of the cooling fluid between the direction to the radiator 101 and the direction to the bypass channel 104. Specifically, when the temperature of the cooling fluid is high, the cooling fluid is guided toward the radiator 101 by the valve 105. In this manner, the heat of the cooling fluid is dissipated by the radiator 101. On the other hand, when the temperature of the cooling fluid is low, the channel is switched by the valve 105 so that the cooling fluid does not pass through the radiator 101. As a result, the cooling fluid is guided toward the bypass channel 104 so that a pressure loss due to the radiator 101 is not generated in the cooling fluid.

The battery of the electric vehicle is charged while the electric vehicle is in a stopped state. At the time of charging, the charger 106 operates, whereas the motor 108 and the inverter 107 do not operate. Moreover, at the time of charging, the circulating pump 102 feeds the cooling fluid to the second cooling fluid channel 103B to cool the charger 106.

Next, FIG. 9 is a configuration diagram illustrating another conventional cooling system for an electric vehicle. The cooling system illustrated in FIG. 9 has a configuration obtained by additionally providing a heater 109 and a heater core 110 in the first cooling fluid channel 103A of the conventional cooling system illustrated in FIG. 8. The heater 109 heats a cooling fluid. The heater core 110 blows warm air into a cabin by using the heated cooling fluid as a heat source.

As the prior art relating to the present invention, there is the one described in Japanese Patent Application Laid-open No. 2008-120244, for example.

In the conventional cooling systems for the electric vehicle as illustrated in FIGS. 8 and 9, the cooling fluid flows into the charger 106 even when the electric vehicle runs. In this manner, the cooling fluid flows even to a device which does not need to be cooled. Therefore, an operation load on the circulating pump 102 becomes large to disadvantageously increase the pressure loss of the cooling fluid. Moreover, with the large operation load on the circulating pump 102, there is a problem in a reduced lifetime of the circulating pump 102.

The problems described above occur not only in the cooling systems for an electric vehicle (EV) and for a hybrid electric vehicle (HEV) but also in a cooling system for an electric system other than a vehicle, which includes a battery, a charger for charging the battery with electric power received from outside, and an electric device to be driven by the electric power of the battery.

SUMMARY OF THE INVENTION

The present invention has been made to solve the problems described above, and therefore has an object to provide a cooling system capable of reducing a pressure loss of a refrigerant to improve operation efficiency of a circulating pump and to increase a lifetime of the circulating pump.

According to the present invention, a cooling system provided to an electric system including a battery, a charger for charging the battery with electric power received from outside, and an electric device to be driven by the electric power of the battery, includes: a heat exchanger; a circulating pump; a first refrigerant channel in which the electric device is provided; a second refrigerant channel in which the heat exchanger is provided, the second refrigerant channel being connected to the first refrigerant channel so as to form a circulation channel of a refrigerant; a bypass channel in which the charger is provided, the bypass channel being connected to the first refrigerant channel in parallel to the second refrigerant channel; and a valve provided at a position where the first refrigerant channel and the bypass channel are connected to each other, for forming a circulation channel of the refrigerant, the circulation channel including the first refrigerant channel and the second refrigerant channel, to restrict a flow of the refrigerant through the bypass channel when the electric device is in operation.

According to the cooling system of the present invention, when the electric device is in operation, the circulation channel of the refrigerant, which includes the first cooling channel and the second cooling channel, is formed by the valve to restrict the flow of the refrigerant through the bypass channel in which the charger is provided. Therefore, the pressure loss of the refrigerant, which is generated due to the flow of the refrigerant into the charger at the time of the operation of the electric device, can be reduced. As a result, the operation efficiency of the circulating pump can be improved, while the lifetime of the circulating pump can be increased.

DETAILED DESCRIPTION OF THE PREFERRED EMBODIMENTS

Hereinafter, preferred embodiments of the present invention are described referring to the accompanying drawings.

Embodiment 1

Figure 1:
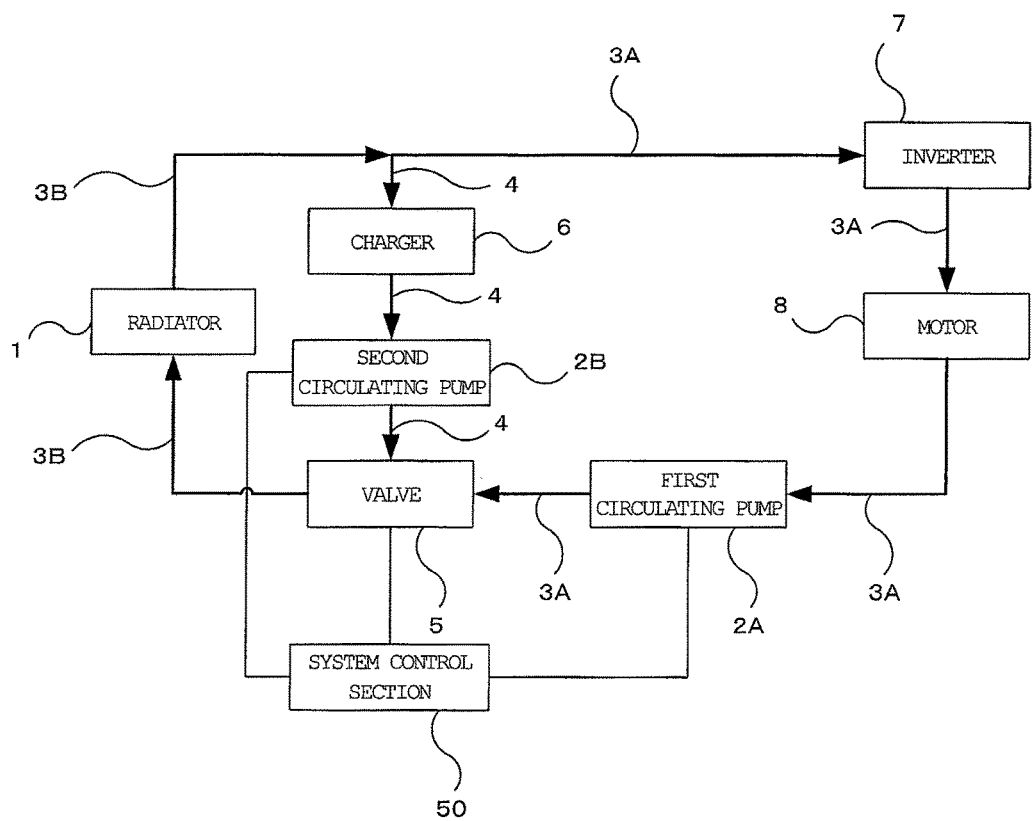
FIG. 1 is a configuration diagram illustrating a cooling system for an electric vehicle according to Embodiment 1 of the present invention.

FIG. 1 is a configuration diagram illustrating a cooling system for an electric vehicle according to Embodiment 1 of the present invention. Note that, an arrow for each channel illustrated in the drawings indicates a direction in which a cooling fluid (refrigerant) flows.

In FIG. 1, the cooling system according to Embodiment 1 includes a radiator (heat exchanger) 1, a first circulating pump 2A, a second circulating pump 2B, a first cooling fluid channel (first refrigerant channel) 3A, a second cooling fluid channel (second refrigerant channel) 3B, a bypass channel 4, and a valve 5.

The radiator 1 is provided in the second cooling fluid channel 3B. The radiator 1 dissipates heat of the cooling fluid to outside to cool the cooling fluid. The first circulating pump 2A is provided in the first cooling fluid channel 3A. The second circulating pump 2B is provided in the bypass channel 4. The first circulating pump 2A and the second circulating pump 2B apply a pressure for causing the cooling fluid to flow, to the cooling fluid.

The first cooling fluid channel 3A and the second cooling fluid channel 3B are connected to each other to form a circulation channel of the cooling fluid through the radiator 1 and the first circulating pump 2A. The bypass channel 4 is connected to the first cooling fluid channel 3A in parallel to the second cooling fluid channel 3B so as to bypass the radiator 1. Note that, each of the channels 3A, 3B, and 4 is formed by a pipe.

The valve 5 is provided at a position where the first cooling fluid channel 3A and the bypass channel 4 are connected to each other. Moreover, the valve 5 performs switching to select any one from the cooling fluid discharged from the first circulating pump 2A and the cooling fluid discharged from the second circulating pump 2B, as the cooling fluid to be allowed to flow to the radiator 1. The driving of the first circulating pump 2A and the second circulating pump 2B, and the operation of the valve 5 are controlled by a system control section 50.

A charger 6 is provided on an intake side of the second circulating pump 2B in the bypass channel 4. The charger 6 converts AC power received from outside into DC power to charge a battery (not shown). An inverter 7 and a motor (electric device) 8 are provided on an intake side of the first circulating pump 2A in the first cooling fluid channel 3A. The inverter 7 converts the DC power received from the battery into AC power to supply the AC power to the motor 8. The charger 6, the inverter 7, and the motor 8 constitute an electric system.

The system control section 50 controls the driving of the first circulating pump 2A and the second circulating pump 2B, and the operation of the valve 5 according to the operations of the charger 6, the inverter 7, and the motor 8. The system control section 50 is connected to an electronic controller (not shown) for collectively controlling behavior of the vehicle. Further, the system control section 50 acquires information about an operating state of the vehicle from the electronic controller.

Further, the system control section 50 monitors a temperature of the cooling fluid through an intermediation of a temperature sensor (not shown) provided in at least one of the channels 3A, 3B, and 4. Still further, the system control section 50 monitors a temperature of the charger 6 through an intermediation of a temperature sensor (not shown) provided to the charger 6, a temperature of the motor 8 through an intermediation of a temperature sensor (not shown) provided to the motor 8, and a temperature of the inverter 7 through an intermediation of a temperature sensor (not shown) provided to the inverter 7. The system control section 50 is constituted by, for example, a microcomputer including a CPU, a RAM, a ROM, and the like.

When the charger 6 is in operation, the system control section 50 drives the second circulating pump 2B and controls the valve 5 to form the circulation channel including the second cooling fluid channel 3B and the bypass channel 4. On the other hand, when the motor 8 is in operation, the system control section 50 drives the first circulating pump 2A and controls the valve 5 to form the circulation channel including the first cooling fluid channel 3A and the bypass channel 4.

Next, an operation is described. The battery of the electric vehicle is charged while the electric vehicle is in a stopped state. Specifically, while the electric vehicle is in the stopped state, the charger 6 operates, whereas the motor 8 and the inverter 7 do not operate. In response to the operation states described above, the system control section 50 drives the second circulating pump 2B to allow the cooling fluid to flow through the bypass channel 4 to cool the charger 6.

At the same time, the system control section 50 controls the operation of the valve 5 to prevent the cooling fluid from flowing from the first cooling fluid channel 3A into the second cooling fluid channel 3B. Specifically, the circulation channel of the cooling fluid, which includes the second cooling fluid channel 3B and the bypass channel 4, is formed by the valve 5. In this state, the system control section 50 places the first circulating pump 2A in a driving-stop state. As a result, while the electric vehicle is in the stopped state, the cooling fluid does not flow into the motor 8 and the inverter 7 which do not need to be cooled. Therefore, a pressure loss of the cooling fluid due to the motor 8 and the inverter 7 is not generated.

Next, while the electric vehicle is running, the motor 8 and the inverter 7 operate, whereas the charger 6 does not operate. In response to the operation states described above, the system control section 50 drives the first circulating pump 2A to allow the cooling fluid to flow through the first cooling fluid channel 3A to cool the motor 8 and the inverter 7. At the same time, the system control section 50 controls the operation of the valve 5 to prevent the cooling fluid from flowing from the bypass channel 4 into the second cooling fluid channel 3B.

Specifically, the circulation channel of the cooling fluid, which includes the first cooling fluid channel 3A and the second cooling fluid channel 3B, is formed by the valve 5. In this state, the system control section 50 places the second circulating pump 2B in a driving-stop state. As a result, the cooling fluid does not flow into the charger 6 which does not need to be cooled while the electric vehicle is running. Therefore, the pressure loss of the cooling fluid due to the charger 6 is not generated.

According to Embodiment 1 described above, when the motor 8 and the inverter 7 are in operation, the circulation channel of the cooling fluid, which includes the first cooling fluid channel 3A and the second cooling fluid channel 3B, is formed by the valve 5. As a result, the flow of the cooling fluid through the bypass channel 4, in which the charger 6 is provided, is restricted. With the above-mentioned configuration, the pressure loss of the cooling fluid, which is generated due to the flow of the cooling fluid into the charger 6, can be reduced when the motor 8 and the inverter 7 are in operation. As a result, operation efficiency of each of the circulating pumps 2A and 2B can be improved, while a lifetime of each of the circulating pumps 2A and 2B is increased.

On the other hand, when the charger 6 is in operation, the circulation channel of the cooling fluid, which includes the second cooling fluid channel 3B and the bypass channel 4, is formed by the valve 5. As a result, the flow of the cooling fluid into the motor 8 and the inverter 7 is restricted. With the above-mentioned configuration, the pressure loss of the cooling fluid, which is generated due to the flow of the cooling fluid into the motor 8 and the inverter 7, can be reduced when the charger 6 is in operation. Therefore, switching between the flow path of the cooling fluid, which is used at the time of operation of the charger 6, and the flow path, which is used at the time of operation of the motor 8 and the inverter 7, is performed by the valve 5. Therefore, the pressure loss of the cooling fluid can be appropriately reduced according to a state of the vehicle.

Figure 2:
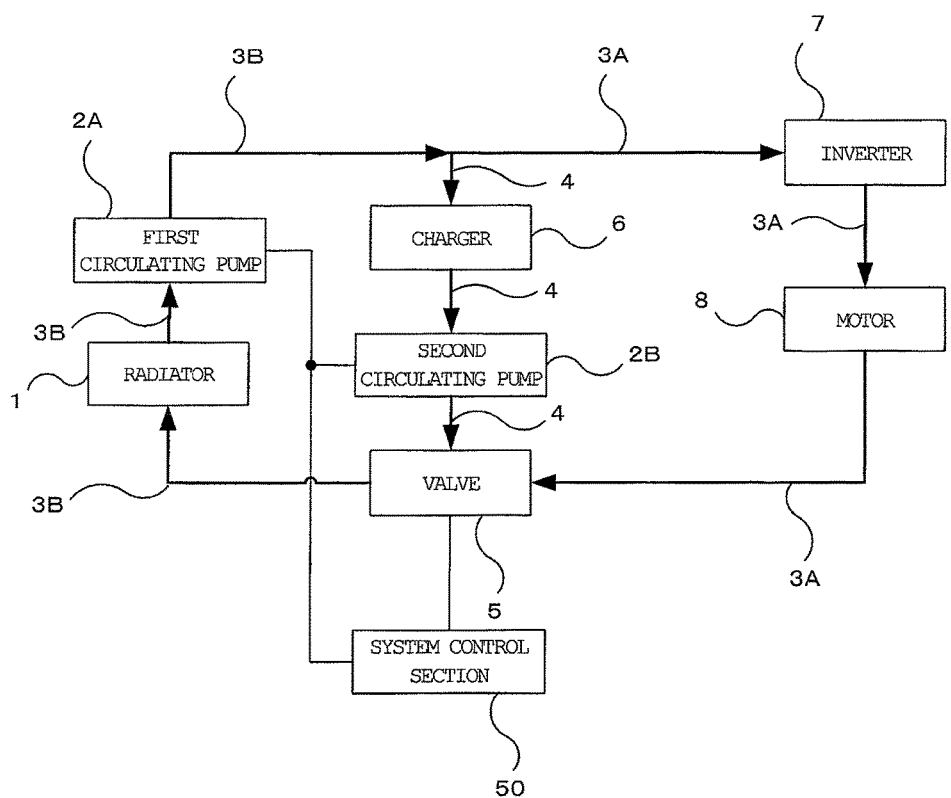
FIG. 2 is a configuration diagram illustrating another example of the cooling system for the electric vehicle according to Embodiment 1 of the present invention.

In Embodiment 1, the first circulating pump 2A may alternatively be provided in the second cooling fluid channel 3B as illustrated in FIG. 2.

Embodiment 2

In Embodiment 1, the example where the two circulating pumps, that is, the first circulating pump 2A and the second circulating pump 2B, are used has been described. In Embodiment 2, an example where a single circulating pump 22 is used is described.

Figure 3:
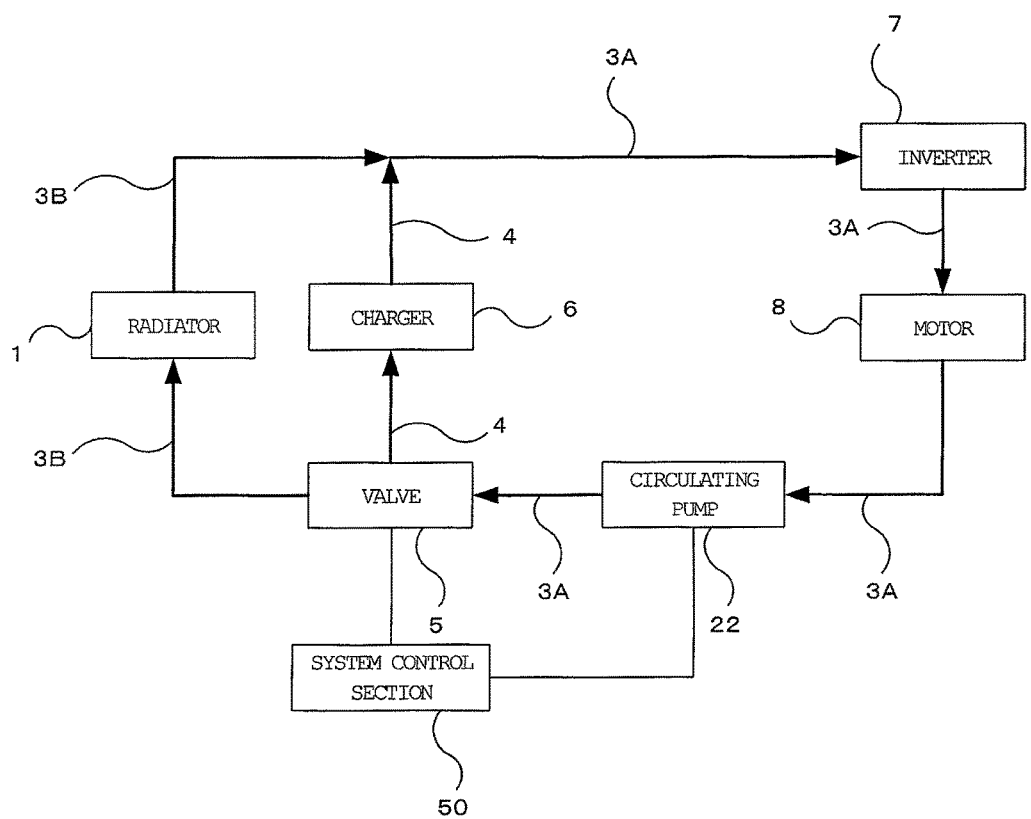
FIG. 3 is a configuration diagram illustrating a cooling system for an electric vehicle according to Embodiment 2 of the present invention.

FIG. 3 is a configuration diagram illustrating a cooling system for an electric vehicle according to Embodiment 2 of the present invention. In FIG. 3, the cooling system according to Embodiment 2 includes the circulating pump 22 in place of the first circulating pump 2A of Embodiment 1. Moreover, the second circulating pump 2B of Embodiment 1 is omitted from the cooling system according to Embodiment 2.

Further, in the cooling system according to Embodiment 2, the direction of the flow of the cooling fluid through the bypass channel 4 is opposite to that of Embodiment 1. The valve 5 according to Embodiment 2 splits the flow of the cooling fluid from the first cooling fluid channel 3A into a sub-flow toward the second cooling fluid channel 3B and a sub-flow toward the bypass channel 4. A ratio of the sub-flows, which are obtained by splitting the flow of the cooling fluid by the valve 5, can be arbitrarily controlled. The remaining configuration is the same as that of Embodiment 1.

Next, an operation is described. The battery of the electric vehicle is charged while the electric vehicle is in a stopped state. Specifically, while the electric vehicle is in the stopped state, the charger 6 operates, whereas the motor 8 and the inverter 7 do not operate. In response to the operation states described above, when a temperature of the cooling fluid is low (less than a predetermined temperature) at the start of charging, the system control section 50 controls the operation of the valve 5 so that the cooling fluid from the first cooling fluid channel 3A is not allowed to flow into the radiator 1 but all the cooling fluid from the first cooling fluid channel 3A flows through the bypass channel 4.

While the electric vehicle is in the stopped state, the motor 8 and the inverter 7 are in an operation-stop state. Thus, each of the motor 8 and the inverter 7 does not generate heat, and therefore has a low temperature. In addition, each of the motor 8 and the inverter 7 has a large heat capacity. Therefore, the motor 8 and the inverter 7 are used as places where the heat generated along with the operation of the charger 6 is released. When the system control section 50 detects that the temperature of each of the cooling fluid, the motor 8, and the inverter 7 is increased to be equal to or higher than the predetermined temperature with elapse of time from the start of charging, the system control section 50 controls the valve 5 to adjust a flow rate of the sub-flow of the cooling fluid toward the radiator 1 so as to maintain an appropriate temperature of the cooling fluid.

Next, while the electric vehicle is running, the motor 8 and the inverter 7 operate, whereas the charger 6 does not operate. In response to the operation states described above, the system control section 50 controls the operation of the valve 5 so that the cooling fluid from the first cooling fluid channel 3A is not allowed to flow through the bypass channel 4 but all the cooling fluid from the first cooling fluid channel 3A flows into the radiator 1. As described above, the cooling fluid is circulated through the circulation channel of the cooling fluid which includes the first cooling fluid channel 3A and the second cooling fluid channel 3B. As a result, the motor 8 and the inverter 7 are cooled. At this time, the cooling fluid does not flow into the charger 6 which is not in operation and therefore does not need to be cooled. Thus, the pressure loss of the cooling fluid due to the charger 6 is not generated.

According to Embodiment 2 described above, when the motor 8 and the inverter 7 are in operation, the circulation channel of the cooling fluid, which includes the first cooling fluid channel 3A and the second cooling fluid channel 3B, is formed by the valve 5 to restrict the flow of the cooling fluid through the bypass channel 4 in which the charger 6 is provided. With the configuration described above, the pressure loss of the cooling fluid due to the flow of the cooling fluid into the charger 6 can be reduced when the motor 8 and the inverter 7 are in operation. As a result, operation efficiency of the circulating pump 22 can be improved, while a lifetime of the circulating pump 22 can be increased.

Moreover, an additional component such as the second circulating pump 2B of Embodiment 1 is not required any more because the cooling fluid is circulated by the circulating pump 22 alone. Therefore, in comparison with Embodiment 1, fabrication cost can be reduced.

Further, when the charger 6 is in operation and, in addition, the temperature of the cooling fluid is less than the predetermined temperature, the circulation channel of the cooling fluid, which includes the second cooling fluid channel 3B and the bypass channel 4, is formed by the valve 5. Then, the heat of the cooling fluid is dissipated by the motor 8 and the inverter 7 which are in a non-operating state. On the other hand, when the charger 6 is in operation and, in addition, the temperature of the cooling fluid is equal to or higher than the predetermined temperature, the circulation channel of the cooling fluid, which includes the second cooling fluid channel 3B and the bypass channel 4, is formed by the valve 5. At the same time, the sub-flow toward the second cooling fluid channel 3B is obtained by splitting the flow of the cooling fluid from the first cooling fluid channel 3A. Then, the heat of the cooling fluid is dissipated by the radiator 1. With the configuration described above, the pressure loss of the cooling fluid can be reduced, while the increase in temperature of the cooling fluid can be reduced.

Figure 4:
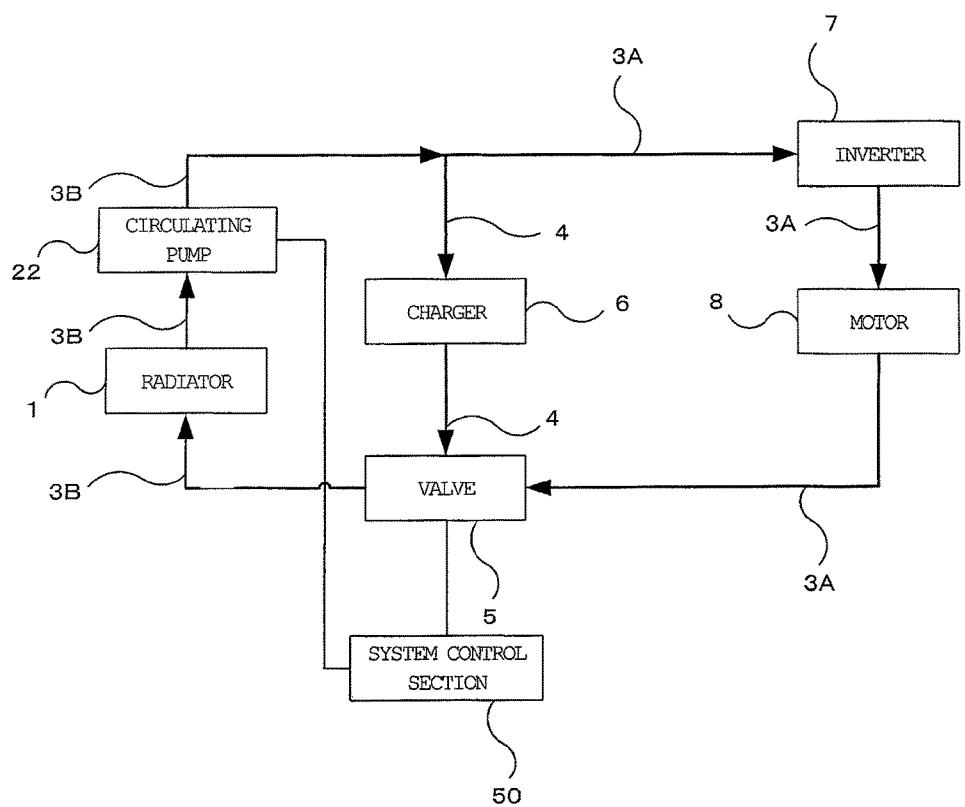
FIG. 4 is a configuration diagram illustrating another example of the cooling system for the electric vehicle according to Embodiment 2 of the present invention.

In Embodiment 2, the circulating pump 22 may alternatively be provided in the second cooling fluid channel 3B as illustrated in FIG. 4. In this case, the direction of the flow of the cooling fluid through the bypass channel 4 is opposite to that of the example illustrated in FIG. 3. Specifically, in the example illustrated in FIG. 4, the circulation channel of the cooling fluid, which includes the first cooling fluid channel 3A and the bypass channel 4, is formed by the valve 5 when the charger 6 is in operation. On the other hand, the circulation channel of the cooling fluid, which includes the first cooling fluid channel 3A and the second cooling fluid channel 3B, is formed by the valve 5 when the motor 8 and the inverter 7 are in operation.

Embodiment 3

Figure 5:
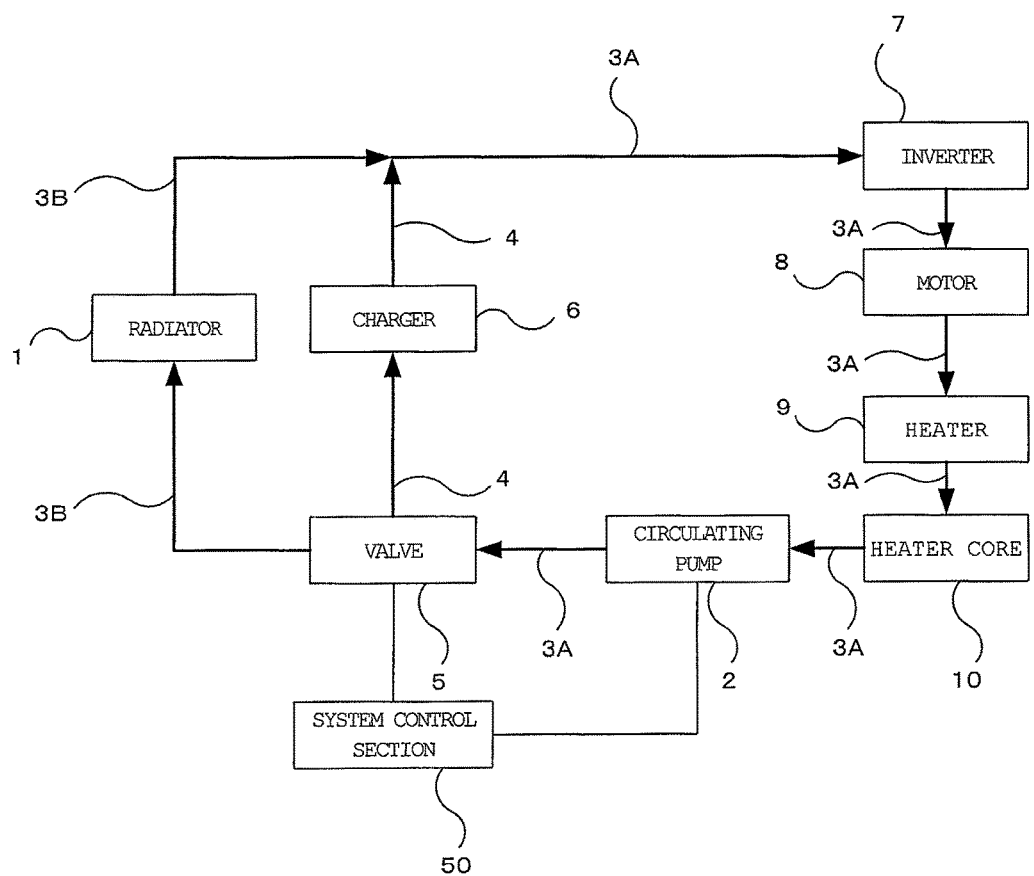
FIG. 5 is a configuration diagram illustrating a cooling system for an electric vehicle according to Embodiment 3 of the present invention.

In Embodiment 3, a cooling system having a heating function is described. FIG. 5 is a configuration diagram illustrating the cooling system for an electric vehicle according to Embodiment 3 of the present invention. In FIG. 5, the cooling system according to Embodiment 3 is obtained by additionally providing a heater (refrigerant heater) 9 and a heater core (heating apparatus) 10 in the first cooling fluid channel 3A of the cooling system according to Embodiment 2. The heater 9 heats the cooling fluid. The heater core 10 blows warm air into a cabin by using the heated cooling fluid as a heat source.

Next, an operation is described. The battery of the electric vehicle is charged while the electric vehicle is in a stopped state. Specifically, while the electric vehicle is in the stopped state, the charger 6 operates, whereas the motor 8 and the inverter 7 do not operate. Moreover, the heater 9 does not operate while charging of the battery because no passengers are present in the cabin. In response to the operation states described above, when a temperature of the cooling fluid is low (less than a predetermined temperature) at the start of charging, the system control section 50 controls the operation of the valve 5 so that the cooling fluid from the first cooling fluid channel 3A is not allowed to flow into the radiator 1 but all the cooling fluid from the first cooling fluid channel 3A flows through the bypass channel 4.

While the electric vehicle is in the stopped state, the motor 8, the inverter 7, and the heater 9 are in an operation-stop state. Thus, each of the motor 8, the inverter 7, and the heater 9 does not generate heat, and therefore has a low temperature. In addition, each of the motor 8 and the inverter 7 has a large heat capacity. Therefore, the motor 8 and the inverter 7 are used as places where the heat generated along with the operation of the charger 6 is released. When the system control section 50 detects that the temperature of each of the cooling fluid, the motor 8, and the inverter 7 is increased to be equal to or higher than the predetermined temperature with elapse of time from the start of charging, the system control section 50 controls the valve 5 to adjust a flow rate of the sub-flow of the cooling fluid toward the radiator 1 so as to maintain an appropriate temperature of the cooling fluid.

Next, while the electric vehicle is running, the motor 8 and the inverter 7 operate, whereas the charger 6 does not operate. While the electric vehicle is running, heating is required because a passenger is present in the cabin. When the temperature of the cooling fluid is less than the predetermined temperature at the start of running of the electric vehicle, the system control section 50 controls the operation of the valve 5 so that the cooling fluid is allowed to flow not into the radiator 1 but through the bypass channel 4. Then, when the temperature of the cooling fluid is increased to be equal to or higher than the predetermined temperature with elapse of running time, the system control section 50 controls the operation of the valve 5 so that the cooling fluid flows into the radiator 1. At this time, the cooling fluid does not flow into the charger 6 which is in a non-operating state and therefore does not need to be cooled. Thus, the pressure loss of the cooling fluid due to the charger 6 is not generated.

According to Embodiment 3 described above, even with the configuration additionally including the heater 9 and the heater core 10, the same effects as those of Embodiment 2 can be obtained.

Embodiment 4

Figure 6:
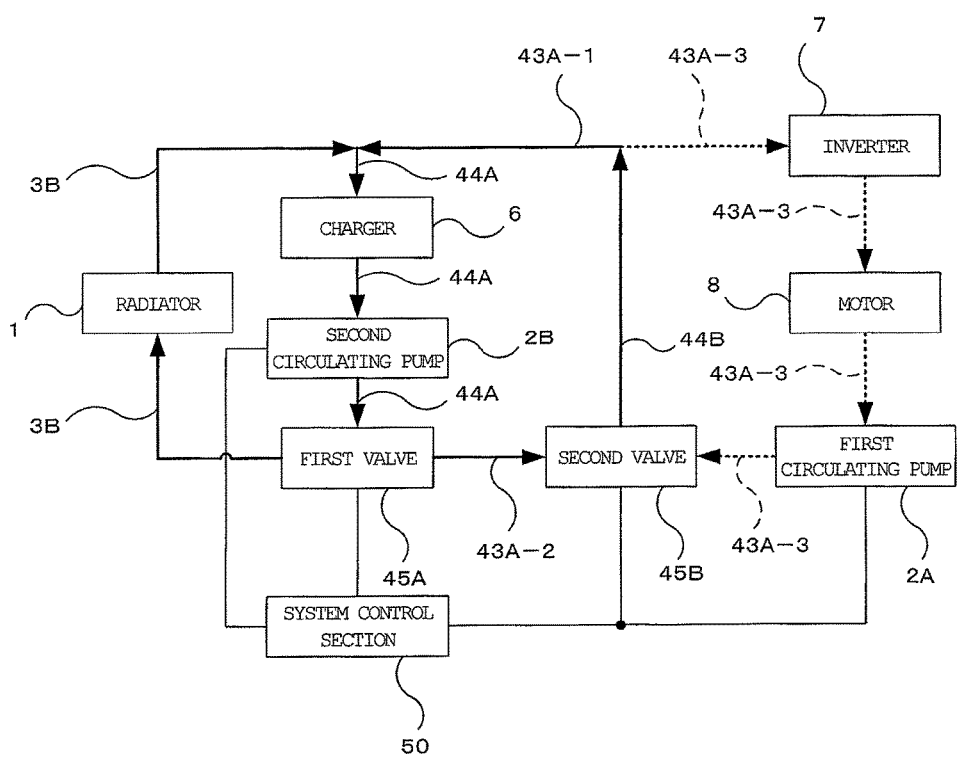
FIG. 6 is a configuration diagram illustrating a cooling system for an electric vehicle according to Embodiment 4 of the present invention.
Figure 7:
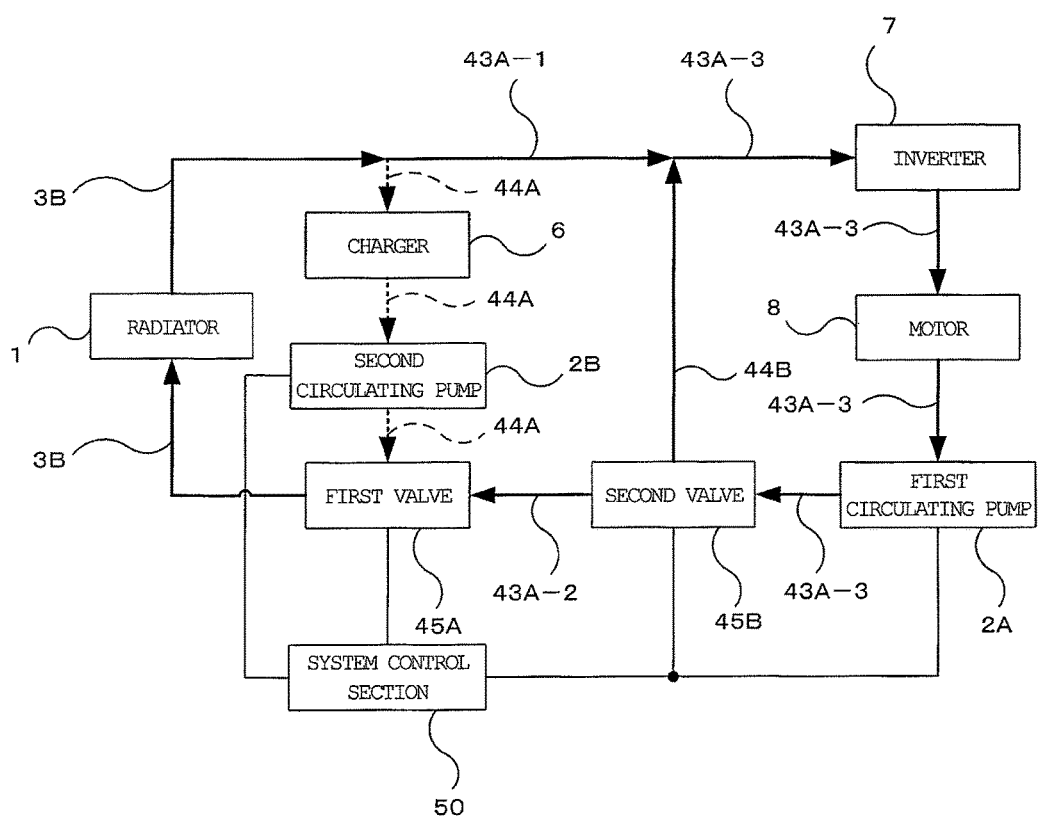
FIG. 7 is another configuration diagram illustrating the cooling system for the electric vehicle according to Embodiment 4 of the present invention.
Figure 8:
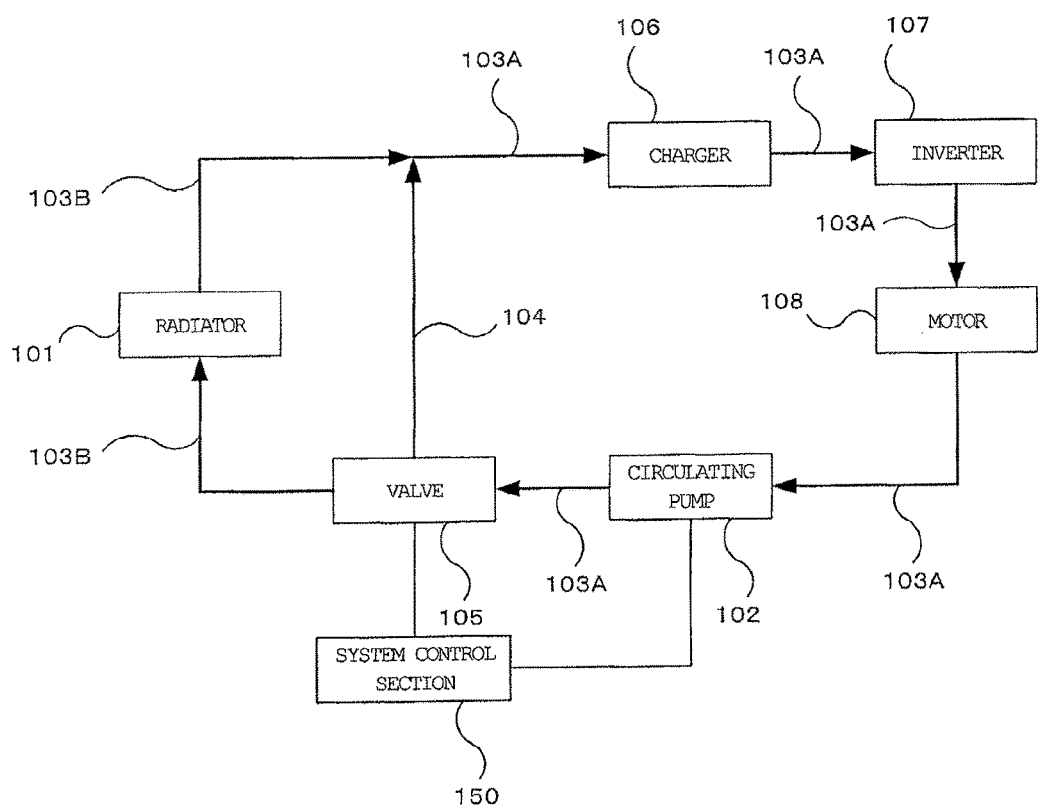
FIG. 8 is a configuration diagram illustrating a conventional cooling system for an electric vehicle.
Figure 9:
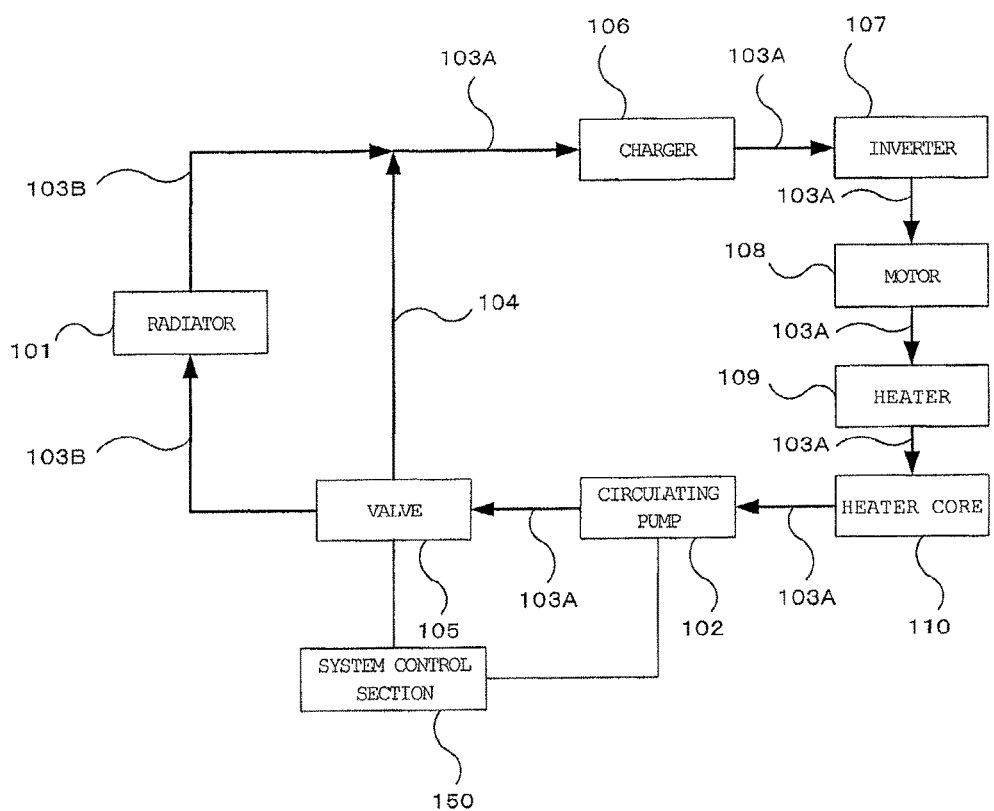
FIG. 9 is a configuration diagram illustrating another conventional cooling system for an electric vehicle.

In Embodiments 1 to 3, the configurations each with the single bypass channel 4 have been described. In response to those configurations, in Embodiment 4, a configuration with two (a plurality of) bypass channels is described. FIGS. 6 and 7 are configuration diagrams illustrating a cooling system for an electric vehicle according to Embodiment 4 of the present invention. Among all the channels illustrated in FIGS. 6 and 7, those indicated by a broken line represent a state in which the flow of the cooling fluid is interrupted by a first valve 45A or a second valve 45B.

In FIGS. 6 and 7, the outline of the cooling system according to Embodiment 4 is the same as the cooling system according to Embodiment 1. In the cooling system according to Embodiment 4, a first bypass channel 44A having the same configuration as that of the bypass channel 4 and a second bypass channel 44B are used in place of the bypass channel 4 of Embodiment 1.

In the cooling system according to Embodiment 4, a first valve 45A having the same configuration as that of the valve 5 of Embodiment 1 and a second valve 45B are used in place of the valve 5 of Embodiment 1. The first valve 45A and the second valve 45B cooperate to form different circulation channels between when the inverter 7 and the motor 8 are in operation and when the charger 6 is in operation.

Further, in the cooling system according to Embodiment 4, three channels, that is, a first inter-bypass channel 43A-1, a second inter-bypass channel 43A-2, and an electric device channel 43A-3 correspond to the first cooling fluid channel 3 of Embodiment 1. In the following description, the first inter-bypass channel 43A-1, the second inter-bypass channel 43A-2, and the electric device channel 43A-3 are collectively referred to as a first cooling fluid channel 43A.

The second bypass channel 44B is connected to the first cooling fluid channel 43A in parallel to the first bypass channel 44A, the inverter 7, and the motor 8 (that is, the electric device). The second valve 45B is provided at a position where the first cooling fluid channel 43A and the second bypass channel 44B are connected to each other. An operation of the second valve 45B is controlled by the system control section 50.

Here, a part of the first cooling fluid channel 43A (illustrated in an upper part of each of FIGS. 6 and 7) between an end of the first bypass channel 44A and an end of the second bypass channel 44B corresponds to the first inter-bypass channel 43A-1. A part of the first cooling fluid channel 43A (illustrated in a lower part of each of FIGS. 6 and 7) between the other end of the first bypass channel 44A and the other end of the second bypass channel 44B corresponds to the second inter-bypass channel 43A-2. Further, a part of the first cooling fluid channel 43A between the first inter-bypass channel 43A-1 and the second inter-bypass channel 43A-2 corresponds to the electric device channel 43A-3. The remaining configuration is the same as that of Embodiment 1.

Next, referring to FIG. 6, an operation at the time of charging for the electric vehicle is described. The battery of the electric vehicle is charged while the electric vehicle is in the stopped state. Specifically, while the electric vehicle is in the stopped state, the charger 6 operates, whereas the motor 8 and the inverter 7 do not operate. In response to the operation states described above, when a temperature of the cooling fluid is low (less than a predetermined temperature) at the start of charging, the system control section 50 controls the operations of the first valve 45A and the second valve 45B and the driving of the second circulating pump 2B so that all the cooling fluid from the first bypass channel 44A flows through the second bypass channel 44B (so that the cooling fluid from the first bypass channel 44A does not flow into the radiator 1, the inverter 7, and the motor 8). As a result, the charger 6 is cooled intensively.

Moreover, when the system control section 50 detects that the temperature of the cooling fluid is increased to be equal to or higher than the predetermined temperature, the system control section 50 controls the operation of the first valve 45A to adjust a flow rate of the sub-flow from the first bypass channel 44A through the second cooling fluid channel 3B toward the radiator 1 so as to maintain an appropriate temperature of the cooling fluid.

Next, referring to FIG. 7, an operation at the time of running of the electric vehicle is described. While the electric vehicle is running, the motor 8 and the inverter 7 operate, whereas the charger 6 does not operate. In response to the operation states described above, when the temperature of the cooling fluid is low (less than the predetermined temperature) at the start of running, the system control section 50 controls the operations of the first valve 45A and the second valve 45B and the driving of the first circulating pump 2A so that all the cooling fluid from the electric device channel 43A-3 flows through the second bypass channel 44B (so that the cooling fluid from the electric device channel 43A-3 does not flow into the radiator 1 and the charger 6). As a result, the motor 8 and the inverter 7 are cooled intensively.

Moreover, when the system control section 50 detects that the temperature of the cooling fluid is increased to be equal to or higher than the predetermined temperature, the system control section 50 controls the operation of the second valve 45B to adjust a flow rate of the sub-flow from the electric device channel 43A-3 through the second cooling fluid channel 3B toward the radiator 1 so as to maintain the appropriate temperature of the cooling fluid.

According to Embodiment 4 described above, the second bypass channel 44B and the second valve 45B are additionally provided to the configuration of Embodiment 1. Therefore, the pressure loss of the cooling fluid can be further reduced as compared with Embodiment 1. As a result, operation efficiency of each of the circulating pumps 2A and 2B can be further improved, while a lifetime of each of the circulating pumps 2A and 2B can be increased.

A radiator fin may be provided on an outer circumferential surface of the pipe forming the second bypass channel 44B in Embodiment 4. As a result, the pressure loss is not increased because the radiator fin is not provided on an inner circumference of the pipe through which the cooling fluid flows. Thus, the temperature of the cooling fluid can be reduced by the radiator fin provided on the outer circumferential surface of the pipe.

The examples where the cooling system is used for the electric vehicle have been described in Embodiments 1 to 4. However, the cooling system of the present invention may also be used for a hybrid electric vehicle. Moreover, the present invention may also be applied to an electric system other than a vehicle, which includes a battery, a charger for charging a battery with electric power received from outside, and an electric device to be driven by the electric power of the battery.

Further, the heater 9 and the heater core 10 of Embodiment 3 may be added to the cooling systems according to Embodiments 1, 2, and 4.

What is claimed is:

1. A cooling system provided to an electric system including a battery, a charger for charging the battery with electric power received from outside, and an electric motor to be driven by the electric power of the battery, the cooling system comprising:
   a radiator via which heat of a cooling fluid is dissipated to air outside of the cooling system;
   a first circulating pump;
   a first coolant channel in which the electric motor is provided;
   a second coolant channel in which the radiator is provided, wherein the second coolant channel is connected to the first coolant channel;
   a first bypass channel in which the charger is provided, wherein the first bypass channel and a first circulation channel for the cooling fluid are connected in parallel, the circulation channel for the cooling fluid including the first coolant channel and the second coolant channel;
   a first valve provided at a position where the first coolant channel and the first bypass channel are connected to each other, and the first valve is configured to stop a flow of a cooling fluid through the first bypass channel, the first valve is configured to move to a first actuation position to form the first circulation channel of the cooling fluid including the first coolant channel and the second coolant channel when the electric motor is in operation, and the first valve is configured to move to a second actuation position to form a second circulation channel of the cooling fluid, the second circulation channel including the first coolant channel to supply cooling fluid to the electric motor and the first bypass channel, when the charger is in operation and a temperature of the cooling fluid is less than a predetermined temperature, and the first valve is configured to move to a third actuation position to form a third circulation channel of the cooling fluid, the third circulation channel including the first coolant channel, the second coolant channel and the first bypass channel, to cause a part of the cooling fluid from the first coolant channel to flow through the second coolant channel when the charger is in operation and the temperature of the cooling fluid is equal to or higher than the predetermined temperature, wherein the cooling system comprises only one radiator.

2. The cooling system according to claim 1, wherein the first circulating pump is provided in the first coolant channel.

3. The cooling system according to claim 2, wherein a second circulating pump is provided in the first bypass channel.

4. The cooling system according to claim 1, wherein the first circulating pump is provided in the second coolant channel.

5. The cooling system according to claim 4, wherein a second circulating pump is provided in the first bypass channel.

6. The cooling system according to claim 1, further comprising:
 a second bypass channel connected to the first coolant channel in parallel to the first bypass channel; and
 a second valve provided at a position where the first coolant channel and the second bypass channel are connected to each other, wherein the second valve in cooperation with the first valve forms different circulation channels at time of operation of the electric motor and at time of operation of the charger.

7. The cooling system according to claim 1, wherein a coolant heater for heating the cooling fluid and a second heater using the cooling fluid flowing from the coolant heater as a heat source are provided in the first coolant channel.

* * * * *